(12) United States Patent
Dubey et al.

(10) Patent No.: US 10,447,581 B2
(45) Date of Patent: Oct. 15, 2019

(54) FAILURE HANDLING AT LOGICAL ROUTERS ACCORDING TO A NON-PREEMPTIVE MODE

(71) Applicant: Nicira, Inc., Palo Alto, CA (US)

(72) Inventors: Ankur Dubey, Palo Alto, CA (US); Sami Boutros, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 15/444,343

(22) Filed: Feb. 28, 2017

(65) Prior Publication Data
US 2018/0248785 A1   Aug. 30, 2018

(51) Int. Cl.
*H04L 12/703* (2013.01)
*H04L 12/713* (2013.01)
*H04L 12/24* (2006.01)

(52) U.S. Cl.
CPC ............ *H04L 45/28* (2013.01); *H04L 45/586* (2013.01); *H04L 41/0668* (2013.01); *H04L 41/0816* (2013.01)

(58) Field of Classification Search
CPC ....................................................... H04L 45/28
See application file for complete search history.

(56) References Cited

U.S. PATENT DOCUMENTS

| | | | |
|---|---|---|---|
| 7,738,367 B1 * | 6/2010 | Aggarwal | H04L 45/02 370/229 |
| 9,172,599 B1 * | 10/2015 | Scholl | H04L 41/0654 |
| 2006/0256767 A1 * | 11/2006 | Suzuki | H04L 45/00 370/351 |
| 2007/0183314 A1 * | 8/2007 | Li | H04L 12/4641 370/217 |
| 2009/0150711 A1 * | 6/2009 | Kami | G06F 11/008 714/1 |
| 2010/0131636 A1 * | 5/2010 | Suri | H04L 45/00 709/224 |
| 2011/0149964 A1 * | 6/2011 | Judge | H04L 45/04 370/392 |
| 2012/0127855 A1 * | 5/2012 | Alon | H04L 12/413 370/218 |
| 2016/0226754 A1 | 8/2016 | Zhang et al. | |
| 2018/0167272 A1 * | 6/2018 | Wu | H04L 67/1002 |

\* cited by examiner

*Primary Examiner* — Jason E Mattis
(74) *Attorney, Agent, or Firm* — Su IP Consulting

(57) ABSTRACT

Example methods are provided to handle failure at one or more logical routers according to a non-preemptive mode. The method may include in response to detecting, by a first routing component operating in a standby state, a failure associated with a second routing component operating in an active state, generating a control message that includes a non-preemptive code to instruct the second routing component not to operate in the active state after a recovery from the failure, sending the control message to the second routing component, and performing a state transition from the standby state to the active state. The method may also include in response to detecting, by the first routing component operating in the active state, network traffic during the failure or after the recovery of the second routing component, forwarding the network traffic from the first network to the second network, or from the second network to the first network.

24 Claims, 13 Drawing Sheets

State information after failure recovery based on NPT1 1130

| Edge-A (primary) | Edge-B (secondary) | Mode | |
|---|---|---|---|
| PLR-SR1: ACTIVE | PLR-SR2: STANDBY | Preemptive | ~1132 |
| TLR1-SR1: STANDBY | TLR1-SR2: ACTIVE | Non-preemptive | ~1134 |
| TLR2-SR1: STANDBY | TLR2-SR2: ACTIVE | Non-preemptive | ~1136 |

⇔  Network traffic at tier 0
(after failure recovery)

↔  Network traffic at tier 1
(during failure or after failure recovery)

State information after failure recovery based on NPT1 1330

| Edge-A (primary) | Edge-B (secondary) | Mode | |
|---|---|---|---|
| PLR-SR1: ACTIVE | PLR-SR2: STANDBY | Preemptive | ~1332 |
| TLR1-SR1: STANDBY | TLR1-SR2: ACTIVE | Non-preemptive | ~1334 |
| TLR2-SR1: ACTIVE | TLR2-SR2: STANDBY | Preemptive | ~1336 |

⟷  Network traffic at tier 0 and tier 1 (TLR2)
    (after failure recovery)

⟷  Network traffic at tier 1 (TLR1)
    (during failure or after failure recovery)

FAILURE HANDLING AT LOGICAL ROUTERS ACCORDING TO A NON-PREEMPTIVE MODE

BACKGROUND

Unless otherwise indicated herein, the approaches described in this section are not admitted to be prior art by inclusion in this section.

Virtualization allows the abstraction and pooling of hardware resources to support virtual machines in a virtualized computing environment, such as a Software-Defined Data Center (SDDC). For example, through server virtualization, virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Further, through network virtualization, benefits similar to server virtualization may be derived for networking services in the virtualized computing environment. For example, logical networks may be provisioned, changed, stored, deleted and restored programmatically without having to reconfigure the underlying physical hardware. Logical routers may be configured to provide connectivity to an external network. In practice, similar to a physical router, a logical router is susceptible to failure.

DETAILED DESCRIPTION

Figure 1:
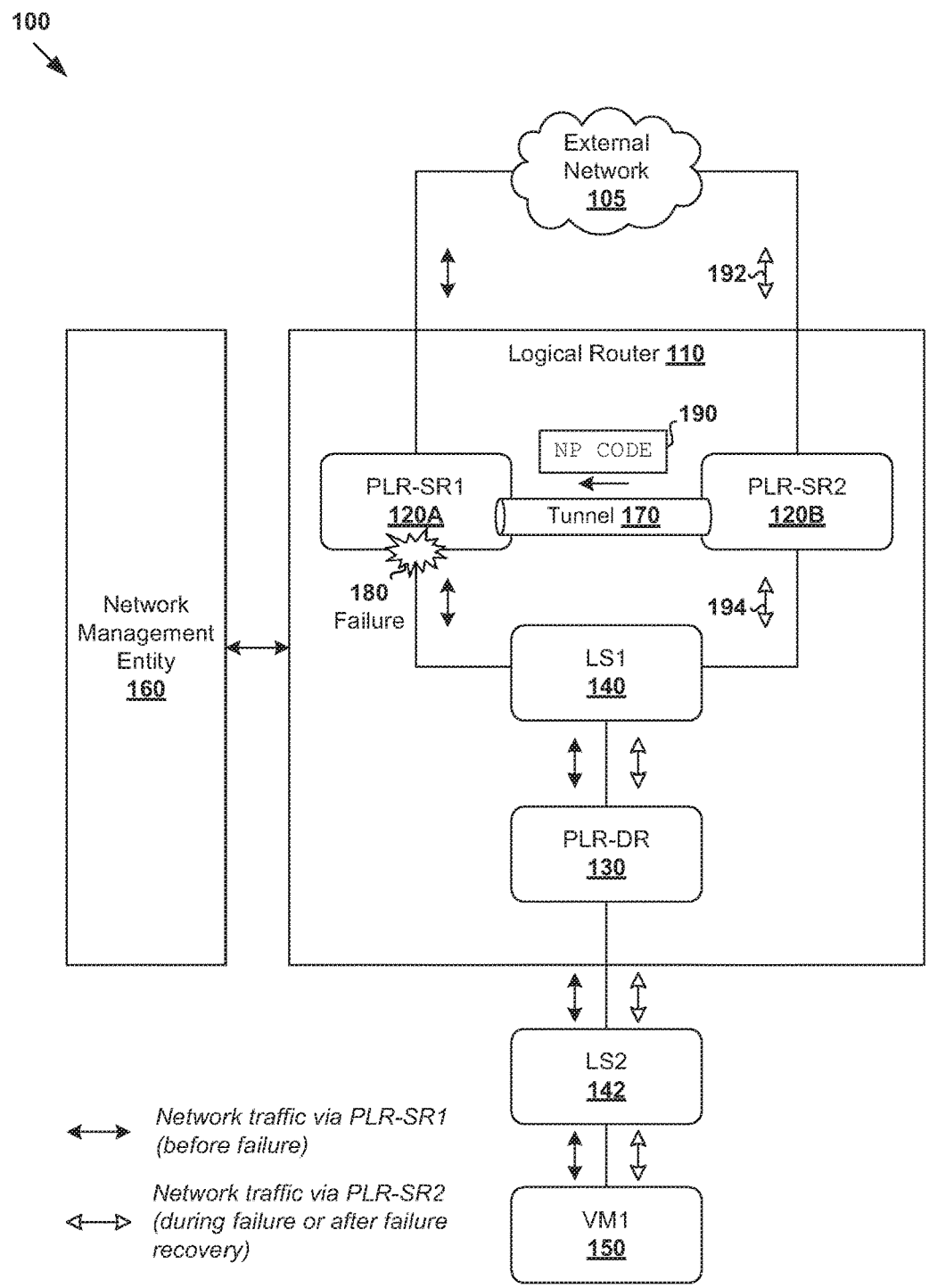
FIG. 1 is a schematic diagram illustrating a management plane view of an example logical router in a logical network.

In the following detailed description, reference is made to the accompanying drawings, which form a part hereof. In the drawings, similar symbols typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 2:
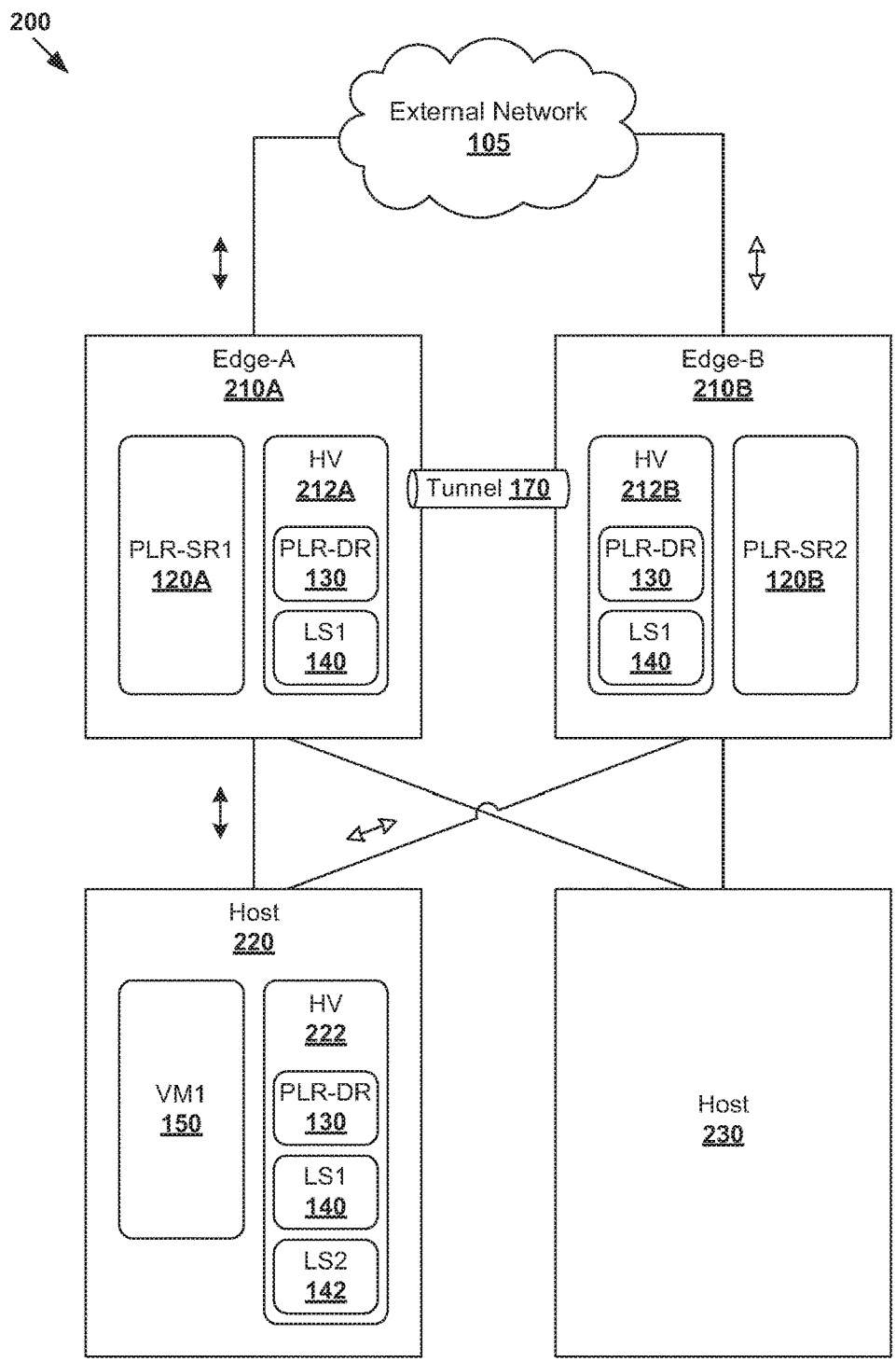
FIG. 2 is a schematic diagram illustrating a physical implementation view of the example logical router in FIG. 1.

Challenges relating to failure handling at logical routers will now be explained in more detail using FIG. 1 and FIG. 2, which represent two different views of the same logical network designed by a user. FIG. 1 is a schematic diagram illustrating a management plane view of example logical router 110 in logical network 100, and FIG. 2 is a schematic diagram illustrating a physical implementation view of example logical router 110 in FIG. 1. It should be understood that, depending on the desired implementation, logical network 100 may include additional and/or alternative component(s) than that shown in FIG. 1 and FIG. 2.

As will be explained further below, the management plane view in FIG. 1 represents how logical router 110 is defined internally, and the physical implementation view in FIG. 2 represents a physical realization of logical router 110. Referring first to FIG. 1, logical router 110 is a provider logical router (PLR) that a service provider (e.g., data center provider) has full control over, and interfaces directly with physical external network 105. Logical router 110 is implemented using multiple routing components, including a distributed router (DR)=PLR-DR 130 and two service routers (SRs)=PLR-SR1 120A and PLR-SR2 120B.

PLR-SR1 120A and PLR-SR2 120B of logical router 110 provide multiple paths for PLR-DR 130 to access external network 105. PLR-SR1 120A and PLR-SR2 120B may also provide centralized stateful services, such as firewall protection, load balancing, network address translation (NAT), etc. PLR-DR 130 is configured to provide first-hop routing, such as for virtual machine VM1 150, etc. In practice, PLR-SR1 120A and PLR-SR2 120B are also known as "centralized" routing components, and PLR-DR 130 as a "distributed" routing component.

PLR-DR 130 is connected to PLR-SR1 120A and PLR-SR2 120B via logical switch LS1 140, which is also known as a transit logical switch. In practice, a transit logical switch is configured to handle communications between routing components that are internal to logical router 110, and not directly connected to any virtual machine. PLR-DR 130 is connected to VM1 150 via logical switch LS2 142 that handles any necessary layer-2 switching. Although not shown for simplicity, PLR-DR 130 may be connected to multiple virtual machines.

Although examples of the present disclosure refer to virtual machines, it should be understood that a "virtual machine" is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running on top of a host operating system without the need for a hypervisor or separate operating system such as Docker, etc.; or implemented as an operating system level virtualization), virtual private servers, client computers, etc. The virtual machines may also be complete computation environments, containing virtual equivalents of the hardware and software components of a physical computing system.

Network management entity 160 represents a network virtualization controller (e.g., software defined network (SDN) controller) on a central control plane in a data center. In practice, the network virtualization controller may be the NSX controller component of VMware NSX®, available from VMware, Inc. The NSX controller controls virtual networks and overlay transport tunnels in the data center under the management of a network virtualization manager on a management plane (e.g., NSX manager component of VMware NSX®). Network management entity 160 may be implemented using physical machine(s), virtual machine(s), or a combination of both. Configuration of logical router 110 may be performed using network virtualization manager and/or network virtualization controller.

Referring to physical implementation view 200 in FIG. 2, PLR-SR1 120A and PLR-SR2 120B may be implemented using multiple edge devices, such as Edge-A 210A and Edge-B 210B, respectively. Here, the term "edge device" may refer generally to a physical machine (e.g., host, etc.) capable of supporting routing components of logical router 110, and any other suitable workload(s). In this example, PLR-SR1 120A and PLR-SR2 120B are implemented using virtual machines supported by respective first hypervisor 212A at Edge-A 210A and second hypervisor at Edge-B 210B. In practice, SR 120A/120B may be implemented using Linux-based datapath development kit (DPDK) packet processing software, etc. Hypervisor 212A/212B may support a managed forwarding element (MFE), virtual switch, etc., to implement transit logical switch LS1 140. Edge-A 210A and Edge-B 210B may be members of a cluster of edge devices that provide services to multiple hosts, including first host 220 and second host 230 (details of the latter are not shown for simplicity).

PLR-DR 130 may span the multiple edge devices to which logical router 110 is bound (e.g., for ingress traffic processing), as well as each host that supports virtual machine(s) connected to PLR-DR 130 (e.g., for egress traffic processing). In the example in FIG. 2, PLR-DR 130 is implemented at first hypervisor 212A associated with PLR-SR1 120A at Edge-A 210A; second hypervisor 212B associated with PLR-SR2 120B at Edge-B 210B; and third hypervisor 222 associated with VM1 150 at host 220. Hypervisor 222 at host 220 may implement an MFE, virtual switch, etc., to implement LS1 140 as well as LS2 142 that provides first-hop switching for VM1 150 in FIG. 1.

Throughout the present disclosure, the term "layer-2" may refer generally to a Media Access Control (MAC) layer; "layer-3" to a network or Internet Protocol (IP) layer; "layer-4" to a transport layer; and "layer-7" to an application layer in the Open System Interconnection (OSI) model, although the concepts described herein may be used with other networking models. The term "packet" may refer generally to a group of bits that can be transported together, such as a "frame", "message", "segment", etc. An outgoing packet from "VM1" 150 to external network 105 is known as an egress or northbound packet. In the reverse direction, an incoming packet from external network 105 is known as an ingress or southbound packet. The term "network traffic" may refer generally to one or more packets.

Active-Standby Configuration

In the example in FIG. 1 and FIG. 2, PLR-SR1 120A and PLR-SR2 120B may operate in an active-active or active-standby configuration. In the active-active configuration, all SRs are active or fully operational at all times and PLR-DR 130 can send egress packets to external network 105 using any one of them. In this case, each edge device has its own Internet Protocol (IP) address and Media Access Control (MAC) address for communicating with external network 105.

In the active-standby configuration, only one SR is active or fully operational at one time and PLR-DR 130 can only send egress packets to external network 105 using the active SR. The active-standby configuration is generally used when stateful services (explained above) are configured. Unlike the active-active configuration, PLR-SR1 120A and PLR-SR2 120B share a common IP address but have different MAC addresses for differentiation.

Further, PLR-SR1 120A and PLR-SR2 120B may be configured as a high availability (HA) pair. For example, PLR-SR1 120A is associated with role=primary, and PLR-SR2 120B with role=secondary. Using the active-standby configuration, PLR-SR1 120A at Edge-A 210A usually operates as the active SR, and PLR-SR2 120B at Edge-B 210B as the standby SR. In case of a failure at the active SR, the standby SR initiates a switchover or failover process to take over as the active SR to handle traffic forwarding to and from external network 105.

To implement the active-standby configuration, each SR has to be able to detect the liveness or failure associated with its peer. For example in FIG. 1 and FIG. 2, a fault detection session may be established using over tunnel 170 between Edge-A 210A and Edge-B 210B. Here, the term "tunnel" may generally refer to an end-to-end, bi-directional communication path between a pair of virtual tunnel endpoints (VTEPs). More particularly, tunnel 170 may be established between first hypervisor 212A acting as a first VTEP and second hypervisor 212B acting as a second VTEP using any suitable protocol, such as Virtual eXtension Local Area Network (VXLAN), Stateless Transport Tunneling (STT), etc.

The fault detection session may be established using any suitable fault detection or continuity check protocol, such as Bidirectional Forwarding Detection (BFD) as defined in the Internet Engineering Task Force (IETF) Request for Comments (RFC) 5880, etc. For example, through a BFD session over tunnel 170, a pair of SRs (e.g., PLR-SR1 120A and PLR-SR2 120B) may monitor each other's aliveness or failure through BFD control messages. The fault detection session may also be established using any suitable reliable transport mechanism. To provide redundancy, the aliveness may be detected by exchanging heartbeat messages over a management network.

Conventionally, failure handling is performed according to a preemptive mode. In this case, when there is a failure associated with PLR-SR1 120A at Edge-A 210A, PLR-SR2 120B at Edge-B 210B will take over as the active SR. However, once PLR-SR1 120A has recovered from the failure, the preemptive mode necessitates a series of steps to restore PLR-SR1 120A as the active SR, and PLR-SR2 120B as the standby SR. This way, traffic to and from external network 105 will once again be handled by PLR-SR1 120A. In practice, however, it might not be ideal to implement the preemptive mode. For example, the disruption, overheads and delay associated with the preemption mode may adversely affect the performance of logical router 110.

Failure Handling

According to examples of the present disclosure, failure handling may be performed more efficiently using a non-preeemptive mode. Unlike the conventional preeemptive mode, the non-preemptive mode allows PLR-SR2 120B at Edge-B 210B to continue operating as the active SR once PLR-SR1 120A at Edge-A 210A has recovered from a failure. This avoids the disruption associated with switching over to PLR-SR1 120A, which may incur traffic loss and adversely impact on the availability of stateful services. In the following, various examples will be described using PLR-SR2 120B as an example "first routing component," PLR-SR1 120A as an example "second routing component," logical network 100 as an example "first network," external network 105 as an example "second network."

Figure 3:
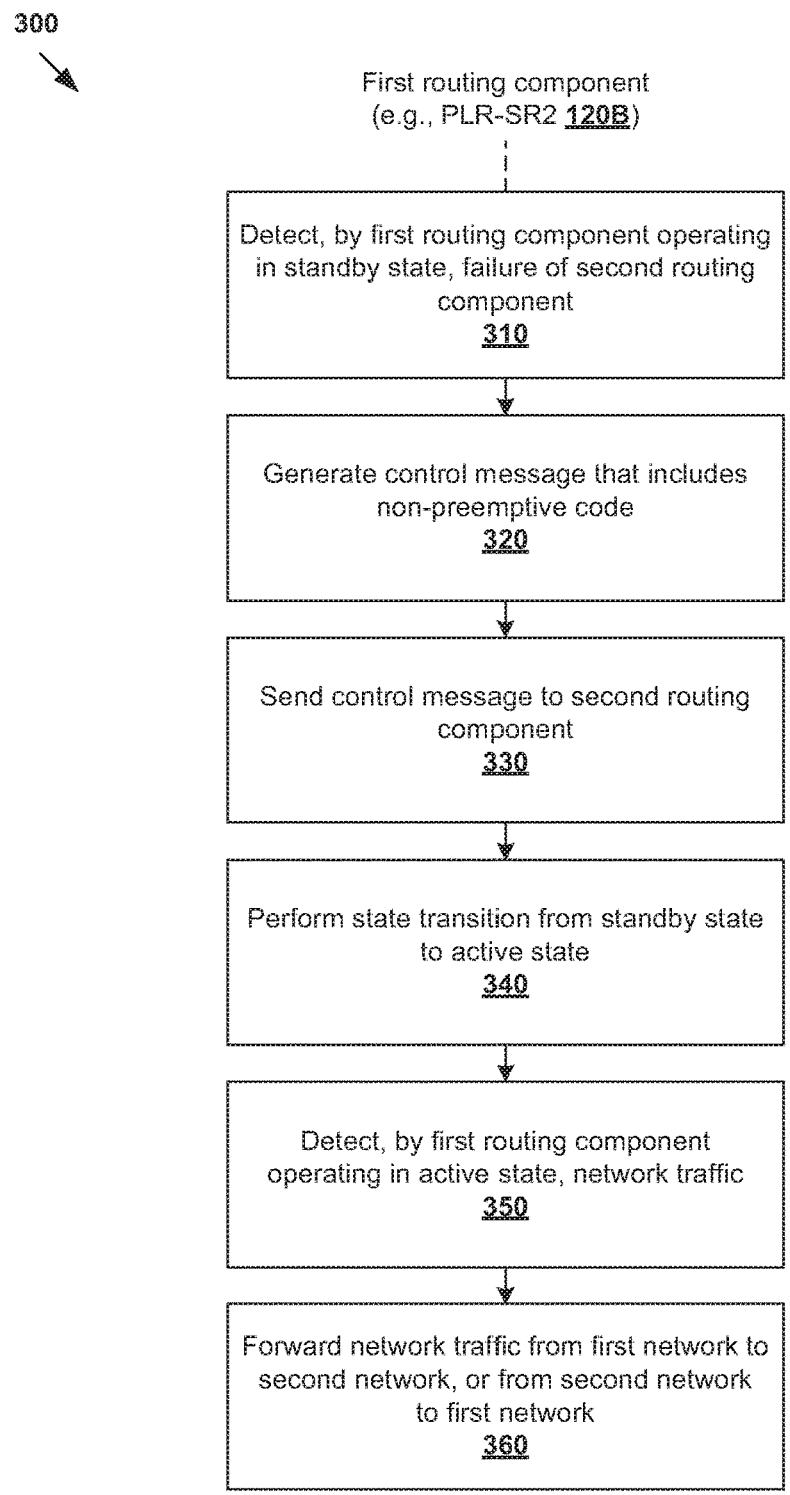
FIG. 3 is a flowchart of an example process for a first routing component to handle failure at a logical router according to a non-preemptive mode.

In more detail, FIG. 3 is a flowchart of example process 300 for a first routing component to handle failure at logical router 110 according to a non-preemptive mode. Example process 300 may include one or more operations, functions, or actions illustrated by one or more blocks, such as 310 to 360. The various blocks may be combined into fewer blocks, divided into additional blocks, and/or eliminated depending on the desired implementation. In practice, example process 300 may be performed by any suitable edge device, such as Edge-B 210B supporting PLR-SR2 120B in the example in FIG. 2.

At 310 in FIG. 3, PLR-SR2 120B operating in a standby state detects a failure (see 180 in FIG. 1) associated with PLR-SR1 120A operating in an active state. As will be described further using FIG. 4 to FIG. 7B, the failure may be detected via a fault detection session (e.g., BFD session) between PLR-SR1 120A and PLR-SR2 120B. The failure may also be detected when PLR-SR2 120B receives a control message (e.g., BFD message) reporting that the failure has occurred at PLR-SR1 120A, such as a loss of connectivity between PLR-SR1 120A and external network 105, etc.

At 320 and 330 in FIG. 3, in response to detecting the failure, PLR-SR2 120B generates a control message that includes a non-preemptive code (see "NP CODE" at 190 in FIG. 1) to instruct PLR-SR1 120A to not operate in the active state after a recovery from the failure, and sends the control message to PLR-SR1 120A. For example, the control message may be sent to inform PLR-SR1 120A (e.g., associated with the primary role) not to transition into the active state after its recovery. Instead, PLR-SR1 120A may operate (and remain) in the standby state in response to receiving the control message. Further, at 340 in FIG. 3, in response to detecting the failure, PLR-SR2 120B performs a state transition from the standby state to the active state.

At 350 in FIG. 3, while operating in the active state, PLR-SR2 120B detects network traffic during the failure or after the recovery of PLR-SR1 120A. At 360 in FIG. 3, PLR-SR2 120B forwards the network traffic from logical network 100 to external network 105, or from external network 105 to logical network 100 (see 192 and 194 in FIG. 1). Using example process 300, PLR-SR2 120B may remain in the active state because PLR-SR1 120A is instructed to not operate in the active state after its recovery from the failure. As such, the disruption, overheads and latency associated with the preemptive mode may be reduced or avoided.

In the following, various examples will be explained using FIG. 4 to FIG. 12. For example, as will be described further using FIG. 4 to FIG. 7B, PLR-SR1 120A and PLR-SR2 120B may transition between the active state, standby state and initialization state according to corresponding transition rules. Further, as will be described further using FIG. 8 to FIG. 13, examples of the present disclosure may be implemented by a multi-tier logical router. In this case, the non-preemptive code in the control message may be configured to implement the non-preemptive mode at a particular tier (e.g., tier 0 or tier 1 only) or multiple tiers (e.g., both tier 0 and tier 1) of the logical router. The non-preemptive code may also be configured to implement the non-preemptive mode for a particular service associated with a set of SRs.

Detailed Process

Figure 4:
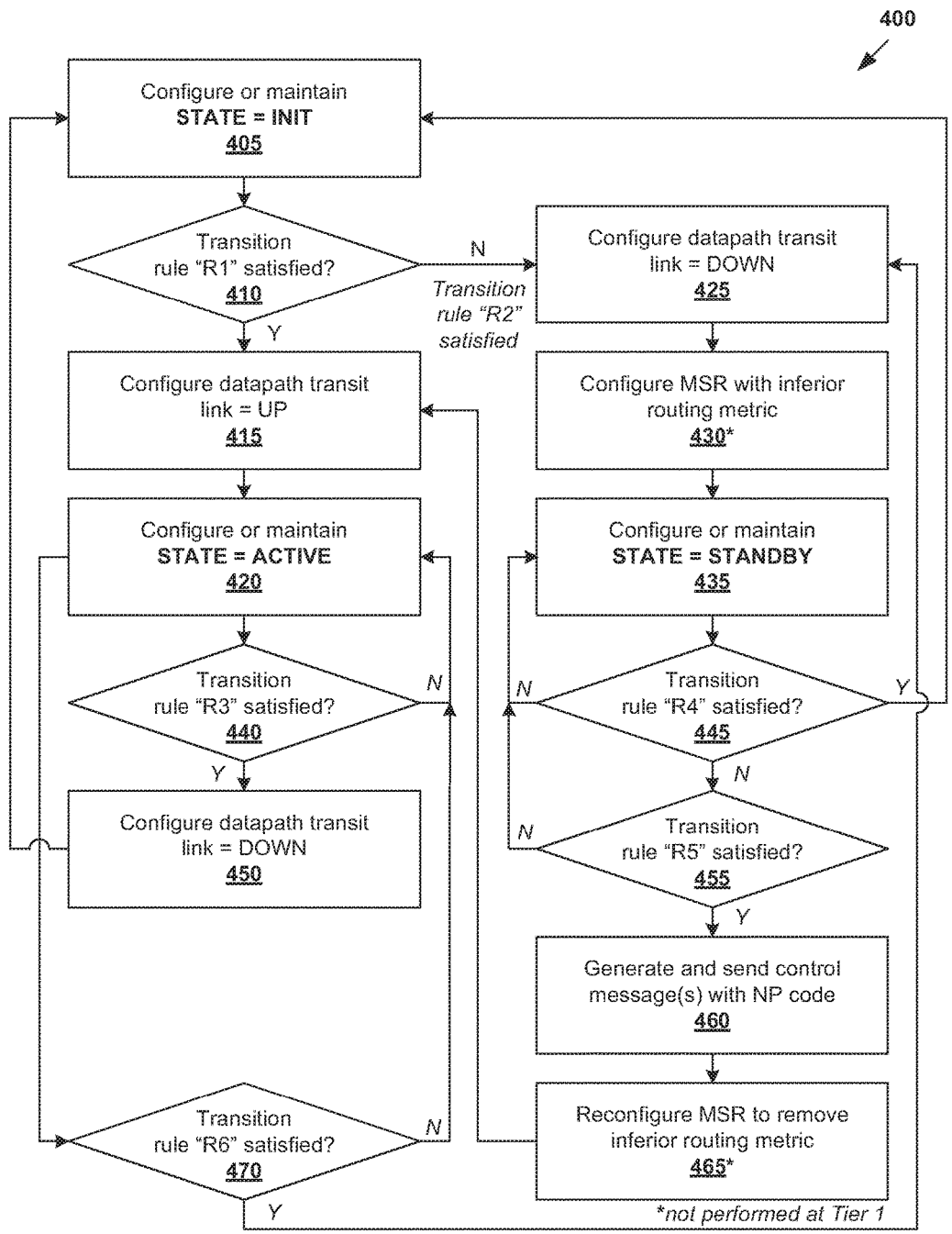
FIG. 4 is a flowchart of an example detailed process for handling failure at a logical router according to a non-preemptive mode.

FIG. 4 is a flowchart of example detailed process 400 for handling failure at logical router 110 according to a non-preemptive mode. Example process 400 may include one or more operations, functions, or actions illustrated by one or more blocks, such as 405 to 465. The various blocks may be combined into fewer blocks, divided into additional blocks, and/or eliminated depending on the desired implementation. The example in FIG. 4 will be explained using FIG. 5, which is state diagram 500 illustrating example state transitions at provider logical router 110 in the example in FIG. 1.

Figure 5:
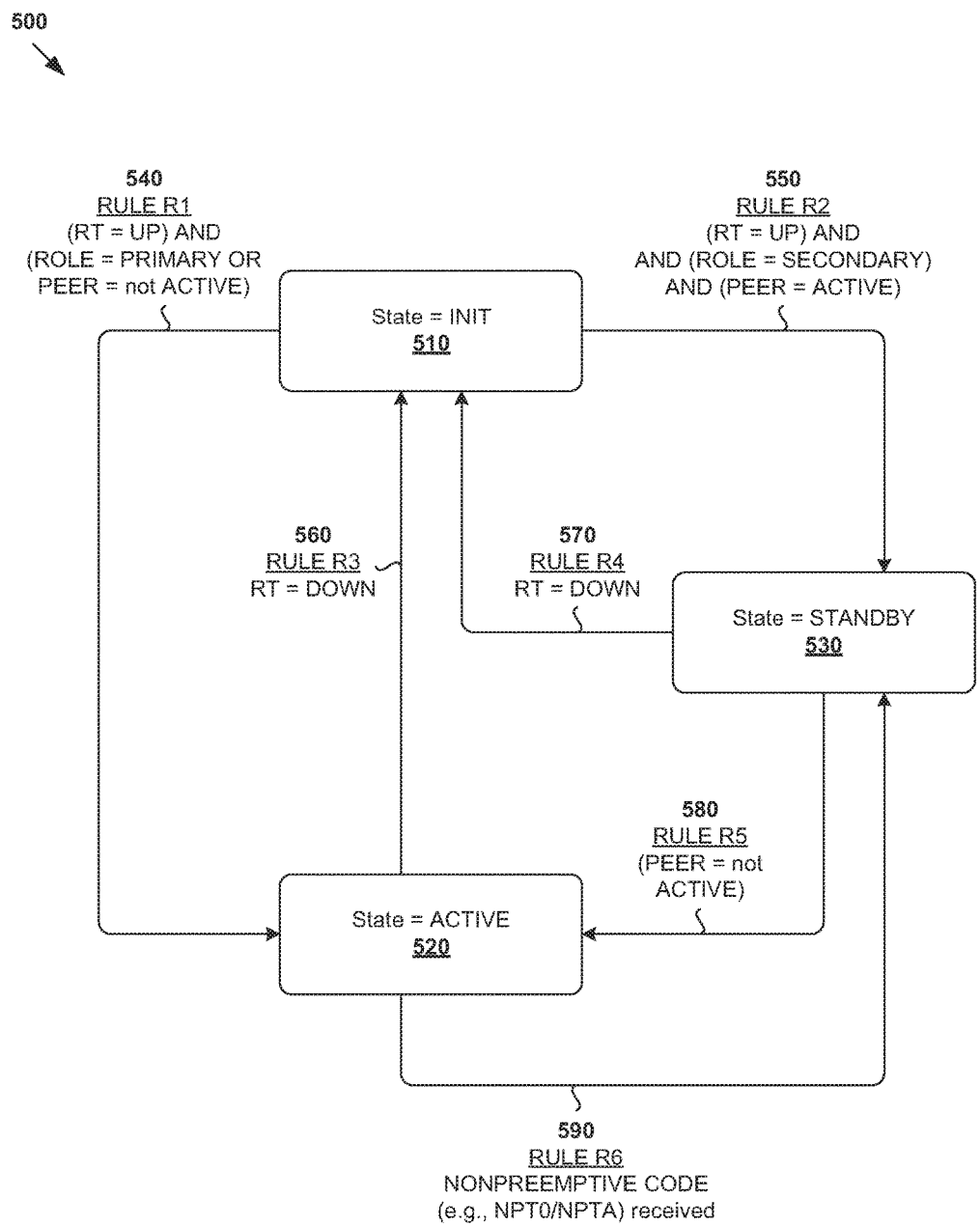
FIG. 5 is a state diagram illustrating example state transitions at a provider logical router in the example in FIG. 1.

According to the examples in FIG. 4 and FIG. 5, SR 120A/120B (i.e., PLR-SR1 120A/PLR-SR2 120B) may operate in one of the following states: (a) initialization state (hereafter "INIT") as shown at 405 in FIGS. 4 and 510 in FIG. 5; (b) active state (hereafter "ACTIVE" as shown at 420 in FIGS. 4 and 520 in FIG. 5; and (c) standby state (hereafter "STANDBY") as shown at 435 in FIGS. 4 and 530 in FIG. 5. SR 120A/120B may transition between INIT, ACTIVE and STANDBY according to corresponding transition rules R1 to R6 in FIG. 5.

(a) INIT to ACTIVE or STANDBY

At 405 in FIG. 4, on boot up or restart, SR 120A/120B operates in state=INIT while trying to detect the aliveness of its peer. For example, PLR-SR1 120A may operate in state=INIT while trying to detect whether its peer (i.e., PLR-SR2 120B) is alive/active via a BFD session between them, and vice versa.

At 410 in FIG. 4, when operating in state=INIT, SR 120A/120B determines whether to perform a state transition from INIT to ACTIVE, or alternatively, from INIT to STANDBY. A first transition rule R1 defines the transition from INIT to ACTIVE, while a second transition rule R2 defines the transition from INIT to STANDBY.

In the example in FIG. 5, rule R1 (see 540) is satisfied when SR 120A/120B has northbound connectivity with external network 105 (i.e., route (RT)=UP), and either is configured role=primary or detects that its peer SR 120B/120A is not active. Rule R2 (see 550 in FIG. 5) is also satisfied when SR 120A/120B has northbound connectivity with external network 105 (i.e., RT=UP), but requires that SR 120A/120B is associated with role=secondary and detects that its peer SR is not ACTIVE. In other words, rule R2 is satisfied when rule R1 is not, and vice versa.

In practice, northbound connectivity may be determined using any suitable approach, such as based on information provided by a process known as "MSR" on edge 210A/210B that performs routing calculations. For example, if no dynamic routing is configured, the MSR process sends forwarding information base (FIB) that includes a static route to SR 120A/120B. The static route leads to an uplink next-hop (e.g., router) in external network 105, and if the next-hop is alive (e.g., BFD=UP), it is determined that there is northbound connectivity (i.e., RT=UP).

In another example, if dynamic routing is configured, the MSR process sends SR 120A/120B FIB that includes a dynamic route to an uplink next-hop, and a control message to a network virtualization agent (e.g., NSX® agent from VMware, Inc.) to report that it has northbound connectivity (i.e., RT=UP). This may be based on the convergence for dynamic routing protocol, forwarding delay management (i.e., a mechanism to provide seamless forwarding to PLR 110), etc. In practice, it is not necessary to establish northbound connectivity if all southbound connectivity is lost.

At 415 and 420 in FIG. 4, in response to determination that rule R1 is satisfied, SR 120A/120B transitions from INIT to ACTIVE. This may involve configuring a datapath transit link=UP before updating the state to ACTIVE. In practice, the datapath transit link refers to a datapath transit interface that connects an SR to a DR. For example, by configuring datapath transit link=UP at PLR-SR1 120A, packets may be forwarded to and from PLR-DR 130 via transit logical switch LS1 140.

At 425 to 435 in FIG. 4, in response to determination that rule R1 is not satisfied (i.e., rule R2 is satisfied), SR 120A/120B transitions from INIT to STANDBY. For example, the state transition may involve configuring datapath transit link=DOWN (see 425 in FIG. 4); configuring the MSR with an inferior routing metric (see 430 in FIG. 4); and updating the state to STANDBY (see 435 in FIG. 4). For example, by configuring datapath transit link=DOWN at PLR-SR2 120B, packets received from PLR-DR 130 via LS1 140 will be dropped. Note that datapath transit link=DOWN when in state=INIT.

Any suitable approach may be used to configure the inferior routing metric to influence ingress traffic from external network 105. In particular, based on the inferior routing metric, the ingress traffic will not be attracted to SR 120A/120B operating in state=STANDBY, but instead to its peer operating in state=ACTIVE. This implementation has the advantage of tying the redistribution of routes with inferior routing metric into dynamic routing protocols such as Border Gateway Protocol (BGP), Open Shortest Path First (OSPF), etc. In the example in FIG. 1, the dynamic routing protocol(s) may be configured on PLR 110 to enable the exchange of routing information with physical routers on external network 105. In the case of BGP, autonomous system (AS) path prepending may be used as the inferior routing metric. For OSPF, a higher external link-state advertisement (LSA) cost may be used.

Figure 6A:
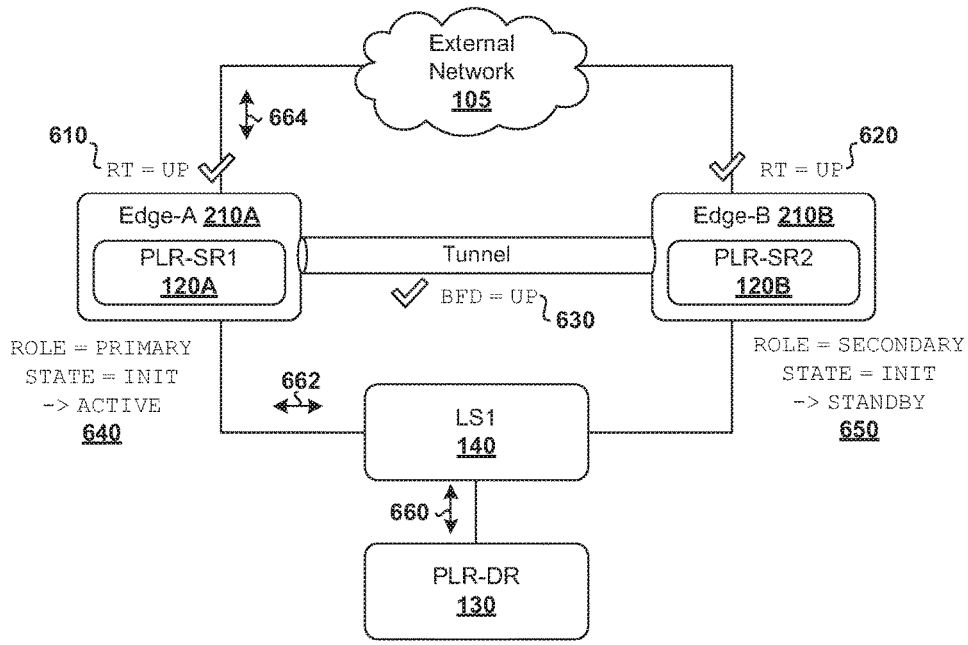
FIG. 6A is a schematic diagram illustrating example state transitions from INIT to ACTIVE and STANDBY.

FIG. 6A is a schematic diagram illustrating example state transitions from INIT to ACTIVE and STANDBY. Upon boot up or restart, PLR-SR1 120A and PLR-SR2 120B both operate in state=INIT. Both detect northbound connectivity (see RT=UP at 610 and 620 in FIG. 6A), and that its peer SR is active via a BFD session between them (see BFD=UP at 630 in FIG. 6A). Since PLR-SR1 120A is associated with role=primary (i.e., rule R1 satisfied), a transition from state=INIT to ACTIVE (see 640 in FIG. 6A) is performed according to 415 and 420 in FIG. 4. When operating in state=ACTIVE, PLR-SR1 120A is responsible for forwarding ingress traffic from, and egress traffic to, external network 105 (see 660, 662, 664).

Further, since PLR-SR2 120B is associated with role=secondary (i.e., rule R2 is satisfied), a transition from state=INIT to STANDBY (see 650 in FIG. 6A) is performed. Since datapath transit link=DOWN and an inferior routing metric is configured according to 425 and 430 in FIG. 4, PLR-SR2 120B will not perform any traffic forwarding when operating in state=STANDBY. In practice, if any point PLR-SR1 120A and PLR-SR2 120B both become ACTIVE (e.g., due to a disconnect in communication), PLR-SR2 120B associated with role=secondary will transition to STANDBY (using a split brain correction mechanism, etc.).

(b) ACTIVE or STANDBY to INIT

Referring to FIG. 4 again, at 440, SR 120A/120B may transition from ACTIVE to INIT according to transition rule R3. Similarly, at 445 in FIG. 4, when operating in state=STANDBY, SR 120A/120B may transition from STANDBY to INIT according to transition rule R4. In the example in FIG. 5, rule R3 (see 560) and rule R4 (see 570) are satisfied when SR 120A/120B detects that it has lost northbound connectivity with external network 105, such as due to a network, hardware or software failure, etc.

At 450 in FIG. 4, if rule R3 is satisfied, SR 120A/120B configures datapath transit interface=DOWN before updating the state from ACTIVE to INIT. Similarly, if rule R4 is satisfied, SR 120A/120B updates its state from STANDBY to INIT (see arrow from block 445 to 405). (Note that datapath transit interface=DOWN is already configured at 425 in FIG. 4). Otherwise (i.e., rule R3 or R4 not satisfied), the corresponding ACTIVE or STANDBY state is maintained.

(c) STANDBY to ACTIVE

At 455 in FIG. 4, when operating in state=STANDBY, SR 120A/120B may transition to state=ACTIVE according to transition rule R5. In the example in FIG. 5, transition rule R5 (see 580) is satisfied when SR 120A/120B detects a failure associated with its peer (i.e., no longer ACTIVE). For example, the failure may be detected when a BFD session between them is detected to be DOWN due to a network, hardware or software failure. In another example, a BFD control message that reports the failure may be received via the BFD session.

In response to determination that rule R5 is satisfied, SR 120A/120B transitions from STANDBY to ACTIVE. In particular, at 460 in FIG. 4, SR 120A/120B generates a control message that includes a non-preemptive code that instructs its peer to operate in state=STANDBY (i.e., not to operate in state=ACTIVE) after a recovery from the failure (related to 310 to 330 in FIG. 3). At 465 in FIG. 4, SR 120A/120B reconfigures its MSR to remove the inferior routing metric to attract inbound traffic from external network 105. Further, at 415 and 420 in FIG. 4 (see link from block 465 to 415), SR 120A/120B configures datapath transit link=UP and updates its state to ACTIVE.

Figure 6B:
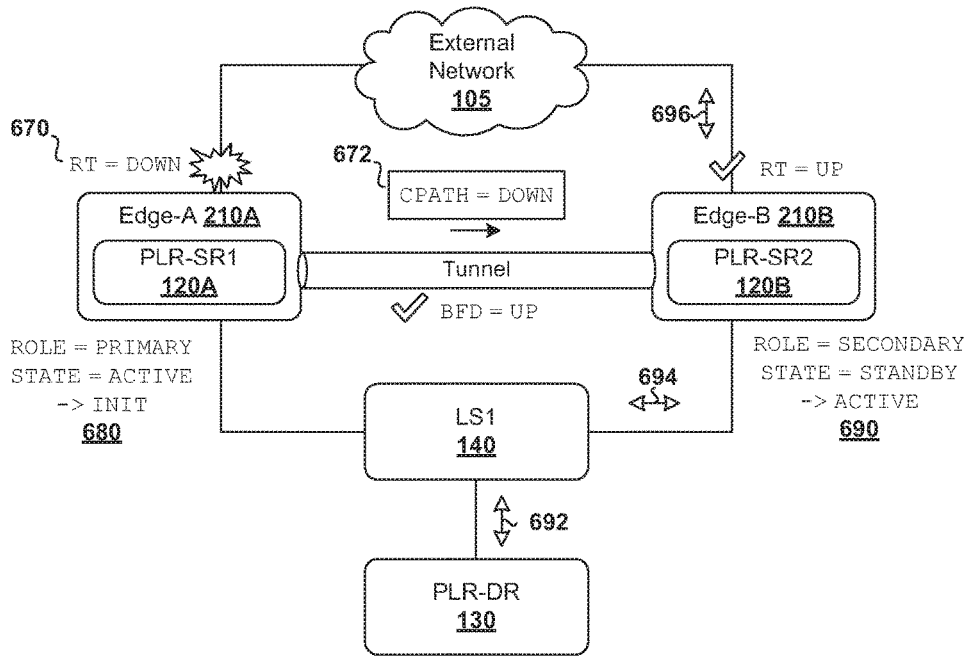
FIG. 6B is a schematic diagram illustrating a first example state transition from STANDBY to ACTIVE.
Figure 7A:
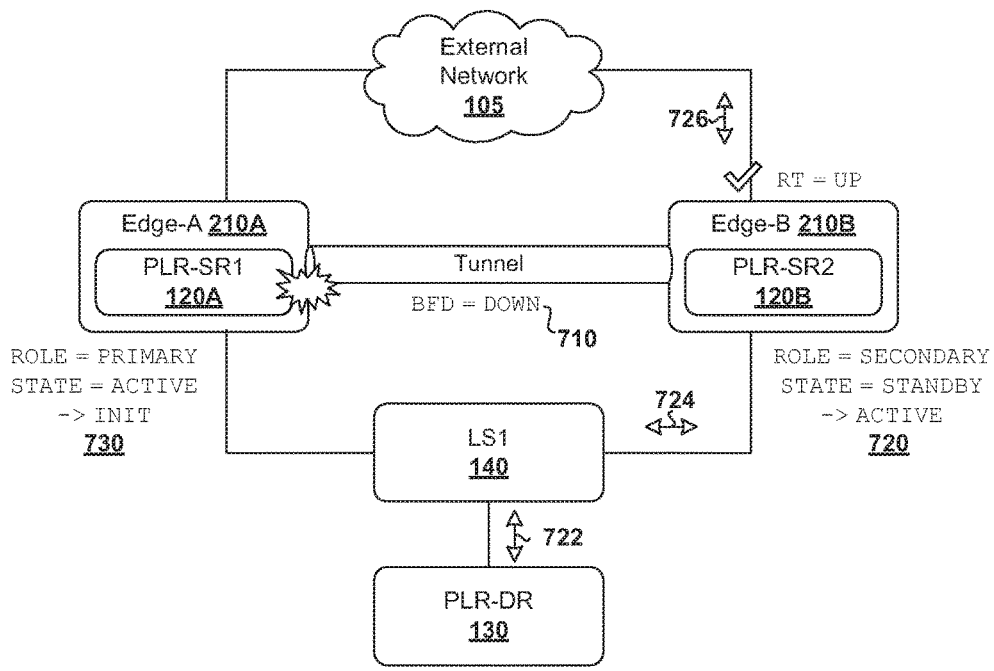
FIG. 7A is a schematic diagram illustrating a second example state transition from STANDBY to ACTIVE.

Referring now to FIG. 6B and FIG. 7A, two example state transitions from STANDY to ACTIVE will be described. In particular, FIG. 6B is a schematic diagram illustrating a first example state transition from STANDBY to ACTIVE, and FIG. 7A is a schematic diagram illustrating a second example state transition from STANDBY to ACTIVE.

In the first example in FIG. 6B, in response to detecting a loss of northbound connectivity with external network 105 (see RT=DOWN at 670 in FIG. 6B), PLR-SR1 120A (role=primary) sends control message 672 to PLR-SR2 120B (role=secondary). Control message 672 includes diagnostic code CPATH=DOWN to report the failure, i.e., the loss of northbound connectivity in this case. Since rule R3 is satisfied, PLR-SR1 120A transitions from ACTIVE to INIT (see 680 in FIG. 6B). The state transition may be performed according to blocks 420, 440, 450 and 405 in FIGS. 4 and 560 in FIG. 5.

At PLR-SR2 120B, in response to detecting the failure associated with PLR-SR1 120A (i.e., no longer ACTIVE) based on control message 672, PLR-SR2 120B determines that rule R5 is satisfied and transitions from STANDBY to ACTIVE (see 690 in FIG. 6B). The state transition may be performed according to blocks 455, 460, 465, 415 and 420 in FIGS. 4 and 580 in FIG. 5. When operating in state=ACTIVE, PLR-SR2 120B forwards network traffic between PLR-DR 130 and external network 105 (see 692, 694, 696 in FIG. 6B).

In the second example in FIG. 7A, PLR-SR2 120B detects that PLR-SR1 120A is no longer ACTIVE based on the status of the BFD session between them (see BFD=DOWN at 710 in FIG. 7A). For example, this may occur when there is a failure at PLR-SR1 120A, such as tunnel failure, edge device crashing, virtual machine corruption (e.g., for virtual-machine-based SRs), datapath corruption (e.g., for DPDK-based SRs), power outage, etc.

In this case, since rule R5 is satisfied, PLR-SR2 120B transitions from STANDBY to ACTIVE (see 720 in FIG. 7A). Similar to the example in FIG. 6B, the state transition from STANDBY to ACTIVE may be performed according to blocks 455, 460, 465, 415 and 420 in FIGS. 4 and 580 in FIG. 5. When operating in state=ACTIVE, PLR-SR2 120B forwards network traffic between PLR-DR 130 and external network 105 (see 722, 724, 726 in FIG. 7A). Depending on the failure at PLR-SR1 120A, it is assigned with state=INIT (see 730 in FIG. 7A) after its failure recovery.

(d) ACTIVE to STANDBY

Once PLR-SR1 120A recovers from the failure in FIG. 6B or FIG. 7A, PLR-SR1 120A determines that rule R1 is satisfied and transitions from INIT to ACTIVE according to blocks 410, 415 and 420 in FIGS. 4 and 540 in FIG. 5. This scenario causes both PLR-SR1 120A and PLR-SR2 120B to be in state=ACTIVE. Conventionally, a default preemptive mode is implemented to necessitate PLR-SR2 120B with role=secondary to transition from ACTIVE to STANDBY such that PLR-SR1 120A with role=primary takes over the ACTIVE state.

According to examples of the present disclosure, a non-preemptive mode may be implemented instead. Referring to FIG. 4 again, at 470, when operating in state=ACTIVE, SR 120A/120B may transition to state=STANDBY according to transition rule R6. In the example in FIG. 5, transition rule R6 (see 590) is satisfied when the SR receives a non-preemptive code in a control message from its peer. In response to determination that rule R6 is satisfied, a state transition from ACTIVE to STANDBY is performed according to blocks 420, 470, 425 and 435 in FIG. 4 (explained above and not repeated here for simplicity).

Figure 7B:
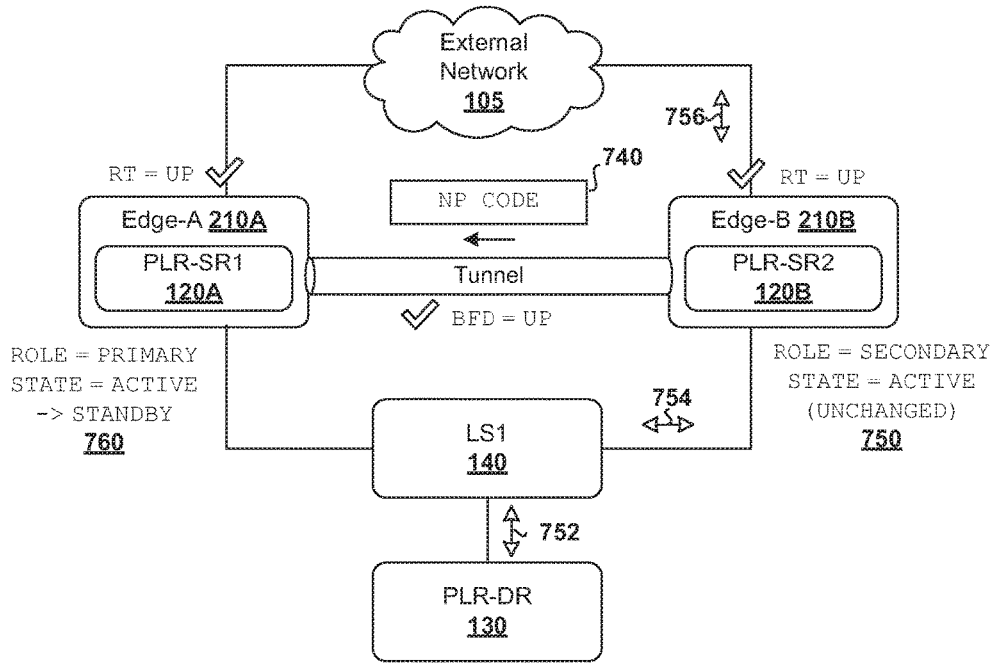
FIG. 7B is a schematic diagram illustrating an example state transition from ACTIVE to STANDBY.

Continuing with the example in FIG. 6B or FIG. 7A, FIG. 7B is a schematic diagram illustrating an example state transition from ACTIVE to STANDBY. According to block 460 in FIG. 4, PLR-SR2 120B generates and sends a control message (see 740 in FIG. 7B) that includes a non-preemptive code as part of its state transition from STANDBY to ACTIVE. The non-preemptive code is to instruct PLR-SR1 120A to transition into STANDBY instead of operating in ACTIVE after its recovery from the failure, thereby preventing a switchover from PLR-SR2 120B to PLR-SR1 120A.

In response to receiving control message 740 with the non-preemptive code, PLR-SR1 120A determines that rule R6 is satisfied and transitions from ACTIVE to STANDBY (see 760 in FIG. 7B). As such, PLR-SR2 120B may continue to operate in state=ACTIVE to handle network traffic to or from PLR-DR 130 and external network 105 (see 752, 754, 756 in FIG. 7B). In practice, the control message may be sent multiple times (i.e., repeatedly) to ensure that PLR-SR1 120A remains in the STANDBY state. Although an example state diagram in shown in FIG. 5, it should be noted PLR-SR1 120A may transition from INIT to STANDBY in response to receiving the control message while in state=INIT once it has recovered from the failure.

Multi-Tier Logical Router

The above examples have been explained using logical router 110 having a single tier. In data centers with multiple tenants, a multi-tier topology may be used. For example, a two-tier logical router topology includes an upper tier of a provider logical router (PLR) and a lower tier of tenant logical router (TLR). The two-tiered structure enables both the provider (e.g., data center owner) and tenant (e.g., data center tenant; often there are multiple tenants) to control their own services and policies at respective tiers. Each tenant has full control over its TLR, which provides indirect access to external network 105 via a PLR.

For multi-tier logical routers, each tier may include both DRs and SRs, or DRs and SRs at the upper tier but only DRs at the lower tier. Some data centers may have only one PLR to which all TLRs attach, whereas other data centers may have numerous PLRs. For example, a large data center may want to use PLR policies for different tenants, or have too many different tenants to attach all of the TLRs to a single PLR. For simplicity, an example with one PLR, two TLRs and both DR and SRs at each tier will be explained using FIG. 8, which is a schematic diagram illustrating a management plane view of an example multi-tier logical router in logical network 800. It should be understood that, depending on the desired implementation, logical network 800 may include additional and/or alternative components than that shown in FIG. 8.

At an upper tier known as "tier 0," PLR 110 includes PLR-SR1 120A and PLR-SR2 120B that provide multiple paths for PLR-DR 130 to connect to external network 105. (Note that PLR 110 is also shown in FIG. 1). At a lower tier known as "tier 1," TLR1 810 and TLR2 812 are connected to PLR 110 via respective transit logical switches LS2 801 and LS3 802.

TLR1 810 (e.g., controlled by a first tenant) includes one DR (i.e., TLR1-DR 840) and two SRs (i.e., TLR1-SR1 820 and TLR1-SR2 830) that are connected via transit logical switch LS4 803. TLR1 810 provides (indirect) access to external network 105 for virtual machines such as VM2 805, which is connected to TLR1-DR 840 via LS5 804. In the example in FIG. 8, TLR1-SR1 820 is associated with role=primary and usually operates in state=ACTIVE, while TLR1-SR2 830 is associated with role=secondary and usually operates in state=STANDBY. When there is a failure (see 880 in FIG. 8) at TLR1-SR1 820, however, a failover is performed and TLR1-SR2 830 transitions from STANDBY to ACTIVE.

TLR2 812 (e.g., controlled by a second tenant) includes one DR (i.e., TLR2-DR 870) and two SRs (i.e., TLR2-SR1 850 and TLR2-SR2 860) that are connected via transit logical switch LS6 806. Similarly, TLR2 812 provides (indirect) access to external network 105 for virtual machines such as VM3 808, which is connected to TLR2-DR 870 via LS7 807. In the example in FIG. 8, TLR2-SR1 850 is associated with role=primary and usually operates in state=ACTIVE, while TLR2-SR2 860 is associated with role=secondary and usually operates in state=STANDBY. When there is a failure (see 890 in FIG. 8) at TLR2-SR1 850, a failover is performed and TLR2-SR2 860 transitions from STANDBY to ACTIVE.

Conventionally, TLR1 810 and TLR2 812 are configured to implement failure handling according to a preemptive mode. In particular, once TLR1-SR1 820 and TLR2-SR1 850 have recovered from failure 880/890, they will take over the ACTIVE state, in which case TLR1-SR2 830 and TLR2-SR2 860 will transition from ACTIVE to STANDBY. Subsequent traffic to and from external network 105 will be handled by TLR1-SR1 820 at first TLR1 810 and TLR2-SR1 850 at second TLR2 812. As discussed using FIG. 1 and FIG. 2, the overheads and latency associated with the preemptive mode might be non-trivial.

Figure 8:
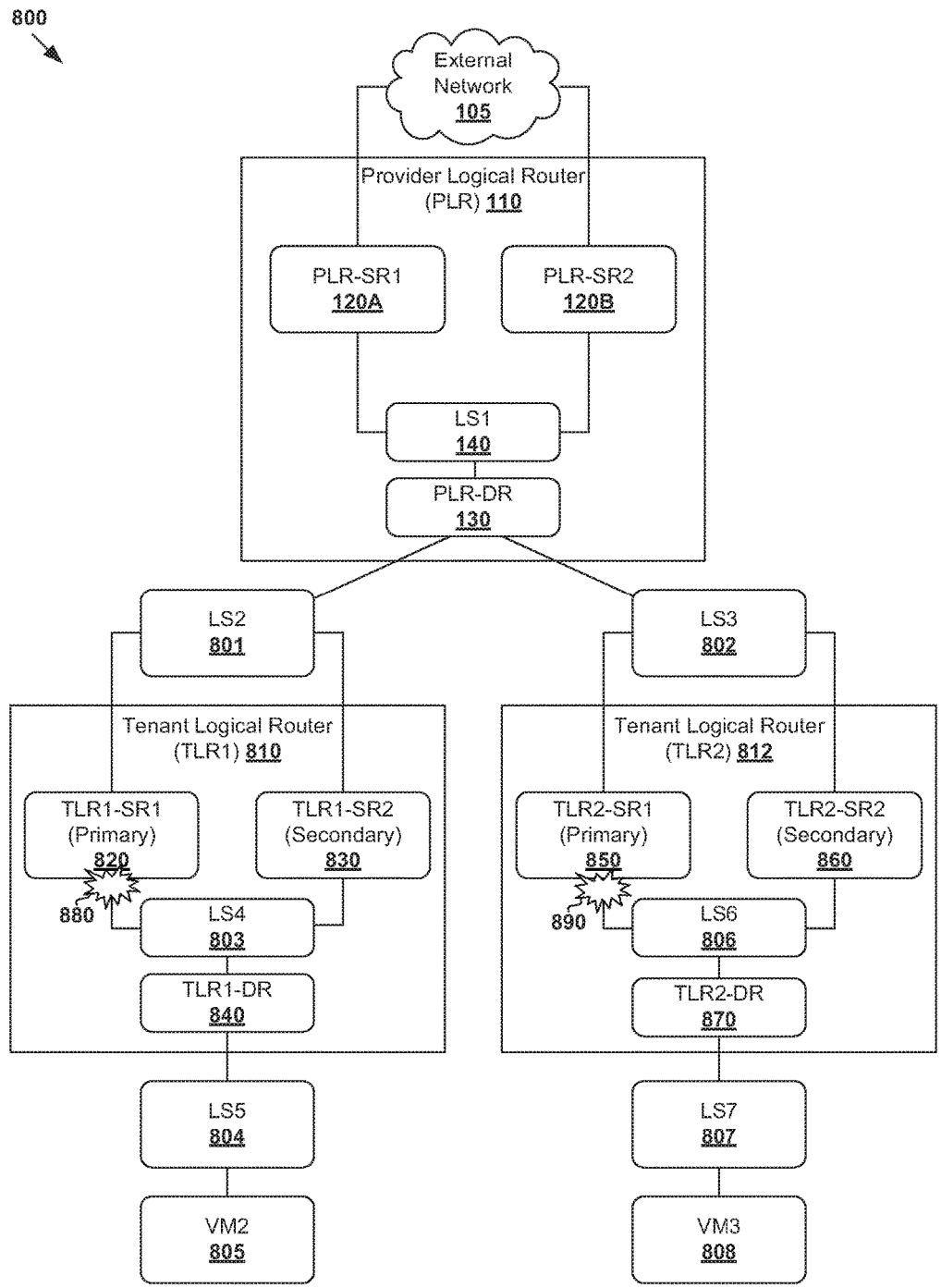
FIG. 8 is a schematic diagram illustrating a management plane view of an example multi-tier logical router in a logical network.

According to examples of the present disclosure, a non-preemptive mode may be implemented to improve the performance of the multi-tier logical router in the example in FIG. 8. The examples discussed using FIG. 1 to FIG. 7B may be implemented by PLR-SR1 120A and PLR-SR2 120B residing on tier 0 of the multi-tier logical router in FIG. 8. For TLR 810/812, tier-1 SRs (e.g., TLR1-SR1 820, TLR1-SR2 830, TLR2-SR1 850 and TLR2-SR2 860) may transition between states INIT, ACTIVE and STANDBY according to a different state diagram in FIG. 9.

Figure 9:
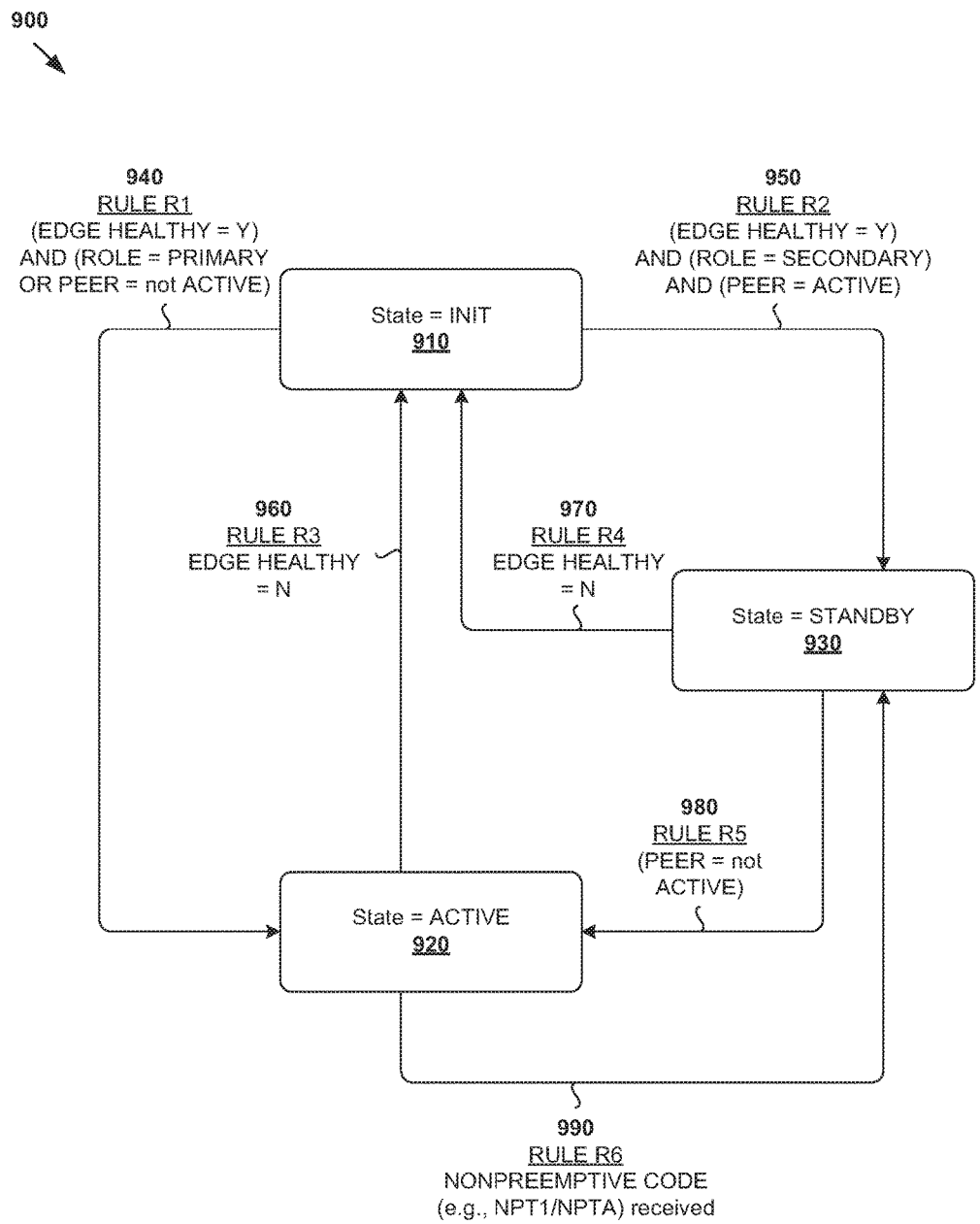
FIG. 9 is a state diagram illustrating example state transitions at a tenant logical router in the example in FIG. 8.

In particular, FIG. 9 is state diagram 900 illustrating example state transitions at tenant logical router 810/812 in the example in FIG. 8. In contrast to the state diagram for PLR 110 in FIG. 5, northbound connectivity (i.e., RT=UP or DOWN) is not used in FIG. 9 because TLR1 810/TLR2 812 is not directly connected to external network 105. Instead, an edge health status is assessed to determine whether to transition from INIT to ACTIVE or STANDBY, and vice versa. An edge device may be considered healthy (i.e., EDGE HEALTHY=Y) if all of its BFD sessions are up and running, including BFD sessions with its peer(s), management BFD session, etc. Otherwise, the edge device is considered to be unhealthy (i.e., EDGE HEALTHY=N). Some example state transitions will be explained below.

(a) INIT to ACTIVE or STANDBY

At 910 and 940 in FIG. 9, a tier-1 SR (e.g., TLR1-SR1 820, TLR1-SR2 830, TLR2-SR1 850 or TLR2-SR2 860 in FIG. 8) may transition from INIT to ACTIVE when rule R1 is satisfied. To satisfy rule R1, the edge device supporting the tier-1 SR has to be healthy (i.e., EDGE HEALTHY=Y), and either the tier-1 SR is associated with role=primary or its peer is not ACTIVE. The transition from INIT to ACTIVE may be performed according to blocks 405 to 420 in FIG. 4.

Alternatively, at 910 and 950 in FIG. 9, the tier-1 SR may transition from INIT to STANDBY when rule R2 is satisfied. Note that rule R2 is satisfied when rule R1 is not. To satisfy rule R2, the edge device supporting the tier-1 SR is unhealthy (i.e., EDGE HEALTHY=N), the tier-1 SR is associated with role=secondary and its peer is ACTIVE. The transition from INIT to STANDBY may be performed according to blocks 405, 410, 425 and 435 in FIG. 4. It is not necessary to configure any inferior routing metric at 430 in FIG. 4 (also marked with an asterisk) because, unlike PLR 110, TLR1 810/TLR2 812 is not directly connected to external network 105.

(b) ACTIVE or STANDBY to INIT

At 920 and 960 in FIG. 9, a tier-1 SR may transition from ACTIVE to INIT when rule R3 is satisfied. Similarly, at 930 and 970 in FIG. 9, a transition from STANDBY to INIT may be performed when rule R4 is satisfied. Both rules R3 and R4 are satisfied when the edge device supporting the tier-1 becomes unhealthy (i.e., EDGE HEALTHY=N). The transition from ACTIVE to INIT may be performed according to blocks 420, 440, 450 and 405 in FIG. 4. The transition from STANDBY to INIT may be performed according to blocks 435, 445 and 405 in FIG. 4.

(c) STANDBY to ACTIVE

At 930 and 980 in FIG. 9, a tier-1 SR may transition from STANDBY to ACTIVE when rule R5 is satisfied. To satisfy rule R5, the tier-1 SR detects a failure associated with its peer, such as when its peer is not ACTIVE or a BFD session between them is DOWN (i.e., BFD=DOWN). The state transition from STANDBY to ACTIVE may be performed according to blocks 435, 455, 460, 415 and 420 in FIG. 4. Note that it is not necessary to remove any inferior routing metric according to block 465 in FIG. 4 (marked with an asterisk).

(d) ACTIVE to STANDBY

At 920 and 990 in FIG. 9, a tier-1 SR may transition from ACTIVE to STANDBY when rule R6 is satisfied (see 920 and 990 in FIG. 9). To satisfy rule R6, the tier-1 SR has received a non-preemptive code from its peer SR after a failure. The transition from ACTIVE to STANDBY may be performed according to blocks 420, 470, 425 and 435 in FIG. 4. Again, it is not necessary to configure any inferior routing metric according to block 430 in FIG. 4 (marked with an asterisk). Although an example state diagram in shown in FIG. 9, it should be noted that an SR may transition from INIT to STANDBY directly (i.e., without transitioning via ACTIVE) once it has recovered from the failure. This transition may occur in response to receiving the non-preemptive code while in state=INIT.

Non-Preemptive Codes

According to examples of the present disclosures, different non-preemptive codes may be configured to implement the non-preemptive mode at a particular tier (e.g., tier 0 or tier 1 only) or multiple tiers (e.g., both tier 0 and tier 1) of a multi-tier logical router. Some examples will be explained using FIG. 10, FIG. 11 and FIG. 12. In these examples, Edge-A 120A and Edge-B 120B (introduced in FIG. 2) each support multiple SRs operating at different tiers. Edge-A 120A supports PLR-SR1 120A, TLR1-SR1 820 and TLR2-SR1 850 that are associated with role=primary. Edge-B 120B supports PLR-SR2 120B, TLR1-SR2 830 and TLR2-SR2 860 that are associated with role=secondary.

(a) Non-Preemptive Mode at Tier 0 (NPT0)

Figure 10:
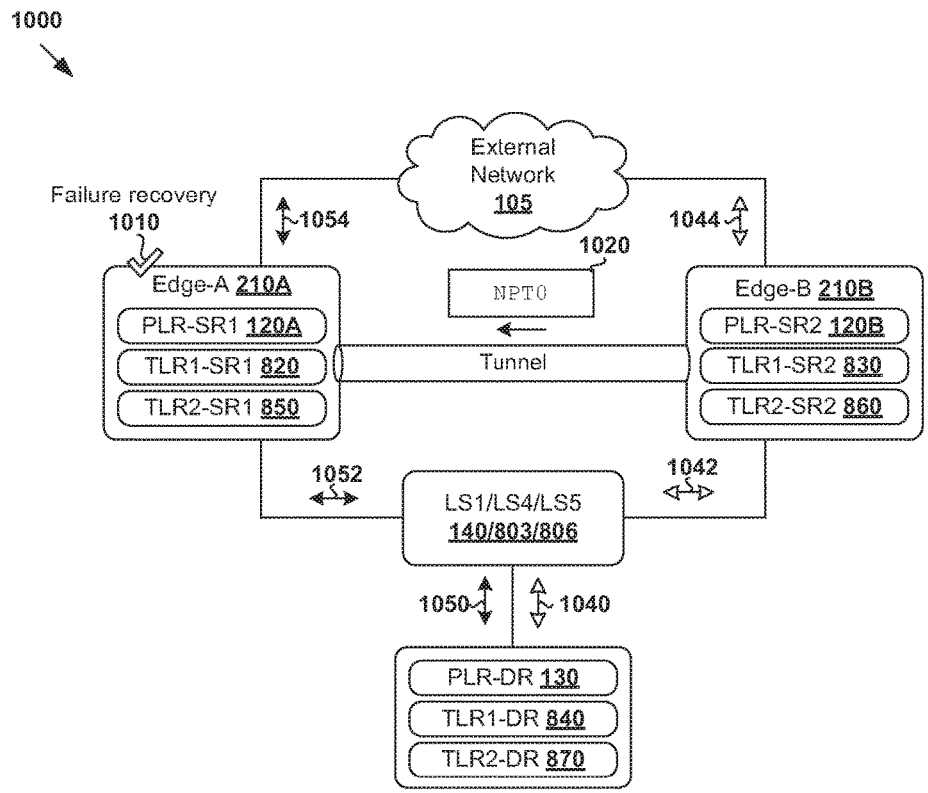
FIG. 10 is a schematic diagram illustrating an example failure handling according to a non-preemptive mode at tier 0 of a multi-tier logical router.

FIG. 10 is a schematic diagram illustrating an example failure handling according to a non-preemptive mode at tier 0 of a multi-tier logical router. In this example, consider the scenario where Edge-A 210A has recovered from a failure (see 1010 in FIG. 10). To implement the non-preemptive mode at tier 0 only, Edge-B 210B sends control message 1020 that includes non-preemptive code=NPT0. This is to instruct Edge-A 210A to not operate all tier-0 SR(s) in state=ACTIVE but instead in STANDBY after its recovery from the failure. The state of each SR after the recovery of Edge-A 210A is shown at 1030 in FIG. 10.

At tier 0, PLR-SR1 120A will operate in state=STANDBY and PLR-SR2 120B will operate in state=ACTIVE (see 1032 in FIG. 10). As such, PLR-SR2 120B will handle all network traffic at tier 0 (see 1040, 1042 and 1044 in FIG. 10) for PLR 110. At tier 1, TLR1-SR1 820 and TLR2-SR1 850 at Edge-A 210A will operate in state=ACTIVE, while TLR1-SR2 830 and TLR2-SR2 860 at Edge-B 210B will operate in state=STANDBY (see 1034 and 1036 in FIG. 10). As such, TLR1-SR1 820 and TLR2-SR1 850 at Edge-A 210A will handle all tier-1 network traffic of respective TLR1 810 and TLR2 812 (see 1050, 1052, 1054 in FIG. 10). In other words, the non-preemptive mode is implemented at tier 0, but not tier 1.

(b) Non-Preemptive Mode at Tier 1 (NPT1)

Figure 11:
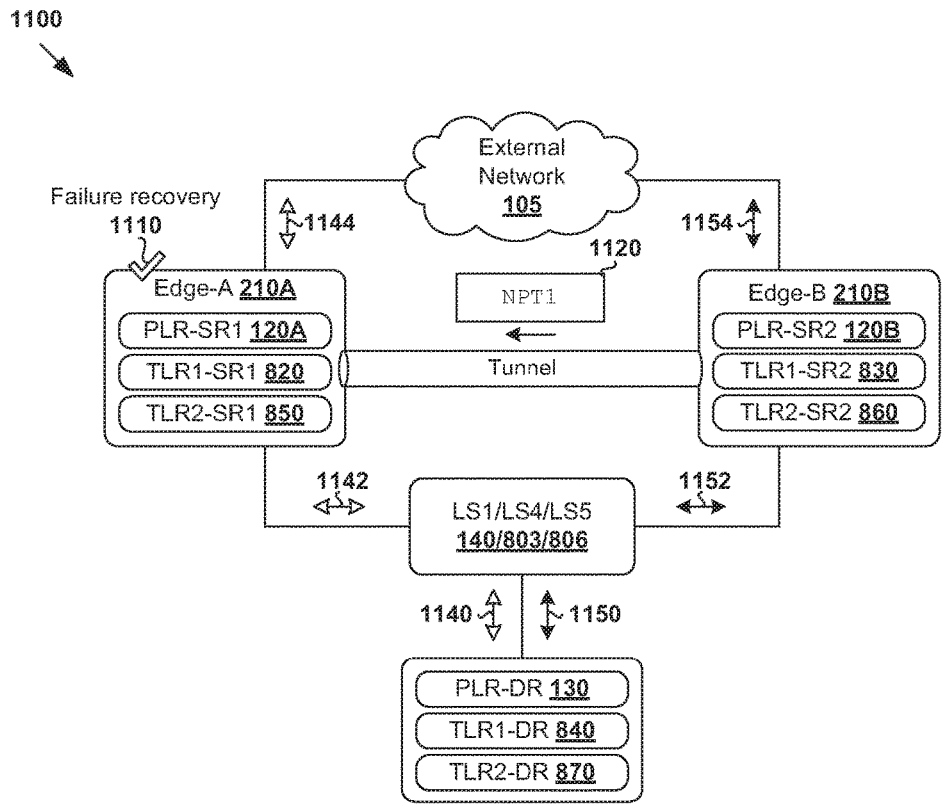
FIG. 11 is a schematic diagram illustrating an example failure handling according to a non-preemptive mode at tier 1 of a multi-tier logical router.

FIG. 11 is a schematic diagram illustrating an example failure handling according to a non-preemptive mode at tier 1 of a multi-tier logical router. Again, consider the scenario where Edge-A 210A has recovered from a failure (see 1110 in FIG. 11). To implement the non-preemptive mode at tier 1 only, Edge-B 210B sends control message 1120 that includes non-preemptive code=NPT1. This is to instruct Edge-A 210A to operate all tier-1 SR(s) in state=STANDBY after its recovery from the failure. The state of each SR after the recovery of Edge-A 210A is shown at 1130 in FIG. 11.

At tier 0, PLR-SR1 120A will operate in state=ACTIVE and PLR-SR2 120B will operate in state=STANDBY (see 1132 in FIG. 11). As such, PLR-SR1 120A will handle all network traffic at tier 0 (see 1140, 1142 and 1144 in FIG. 11) for PLR 110. At tier 1, TLR1-SR1 820 and TLR2-SR1 850 at Edge-A 210A will operate in state=STANDBY. At Edge-B 210B, TLR1-SR2 830 and TLR2-SR2 860 will operate in state=ACTIVE (see 1134 and 1136 in FIG. 11) to handle the tier-1 network traffic of respective TLR1 810 and TLR2 812 (see 1150, 1152, 1154 in FIG. 11). In other words, the non-preemptive mode is implemented at tier 1, but not tier 0.

(c) Non-Preemptive Mode all Tiers (NPTA)

Figure 12:
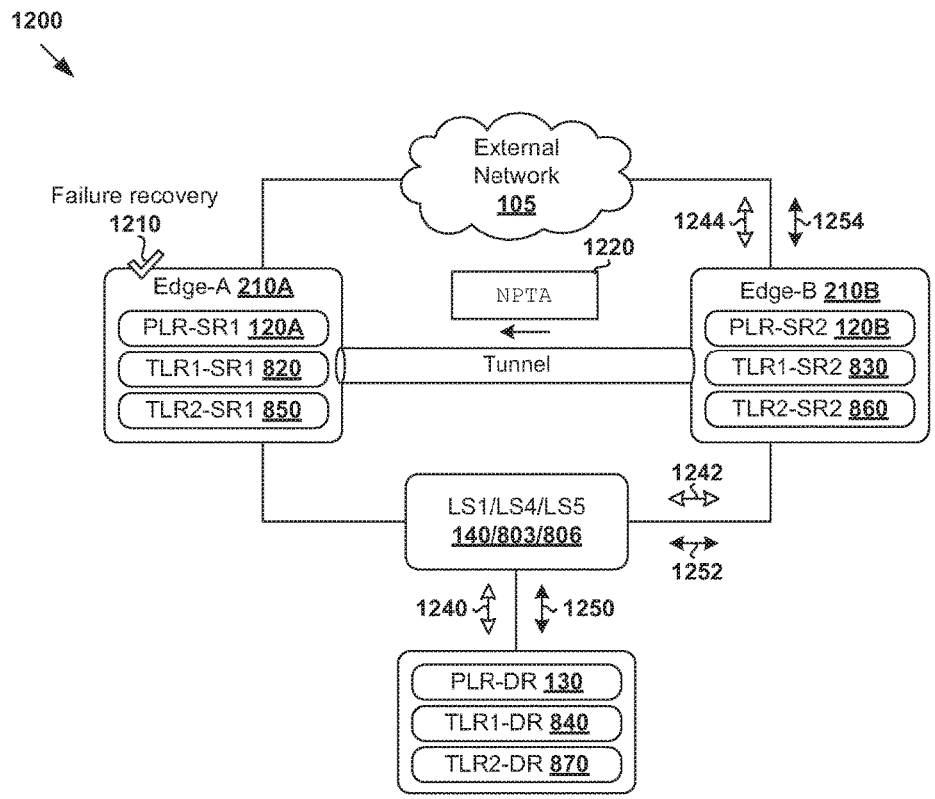
FIG. 12 is a schematic diagram illustrating an example failure handling according to a non-preemptive mode at multiple tiers of a multi-tier logical router.

FIG. 12 is a schematic diagram illustrating an example failure handling according to a non-preemptive mode at multiple tiers of a multi-tier logical router. Again, consider the scenario where Edge-A 210A has recovered from a failure (see 1210 in FIG. 12). To implement the non-preemptive mode at multiple tiers, Edge-B 210B sends control message 1220 that includes non-preemptive code=NPTA. This is to instruct Edge-A 210A to operate all SR(s) residing on both tier 0 and tier 1 in state=STANDBY after its failure recovery. The state of each SR after the recovery of Edge-A 210A is shown at 1230 in FIG. 12.

At tier 0, PLR-SR1 120A will operate in state=STANDBY and PLR-SR2 120B will operate in state=ACTIVE (see 1232 in FIG. 12). As such, PLR-SR2 120B will handle all network traffic at tier 0 (see 1240, 1242 and 1244 in FIG. 12) for PLR 110. At tier 1, TLR1-SR1 820 and TLR2-SR1 850 at Edge-A 210A will operate in state=STANDBY. At Edge-B 210B, TLR1-SR2 830 and TLR2-SR2 860 will operate in state=ACTIVE (see 1234 and 1236 in FIG. 12) to handle all network traffic at tier 1 (see 1250, 1252, 1254 in FIG. 12) for respective TLR1 810 and TLR2 812.

(d) Non-Preemptive Mode for Particular Service(s)

Figure 13:
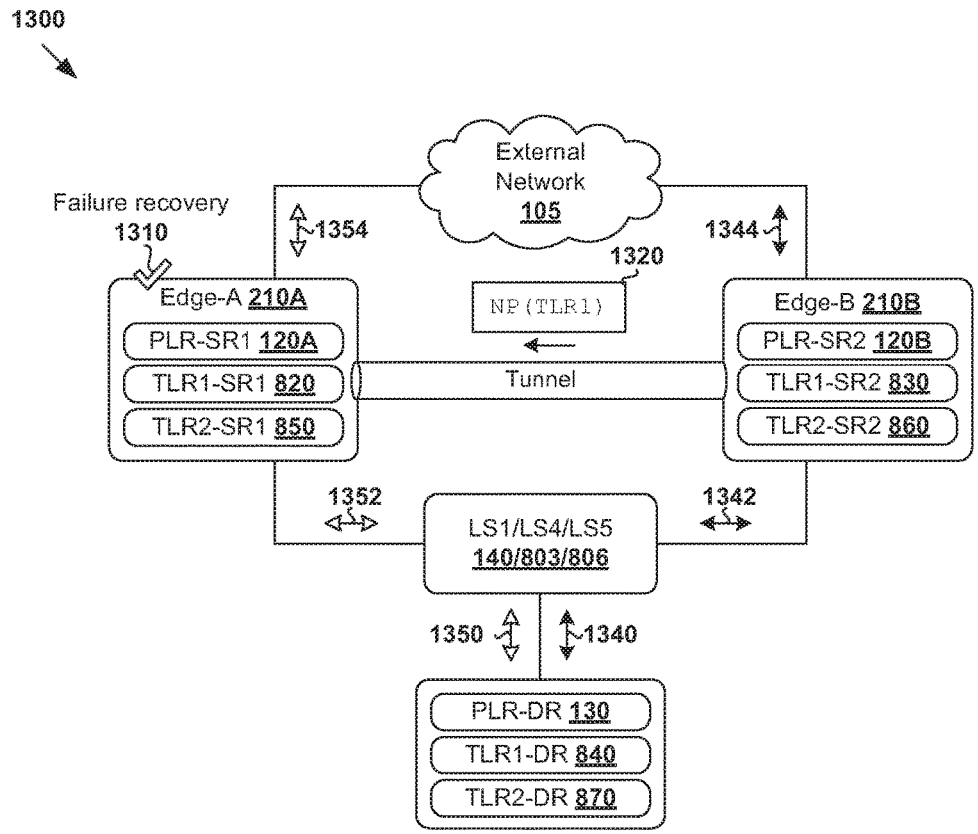
FIG. 13 is a schematic diagram illustrating an example failure handling according to a non-preemptive mode for particular service(s).

FIG. 13 is a schematic diagram illustrating an example failure handling according to a non-preemptive mode for particular service(s). Similar to the above, consider the scenario where Edge-A 210A has recovered from a failure (see 1310 in FIG. 13). To implement the non-preemptive mode at the granularity of services, Edge-B 210B sends control message 1320 that includes a non-preemptive code associated with a list of one or more services.

Using Si to represent service i, non-preemptive code may be "NP(S1)" for one service, or "NP(S1, . . . , SN)" for N services. Each service is provided by a set of SRs. For example in FIG. 8, a first service is associated with PLR-SR1 120A and PLR-SR2 120B at PLR 110, a second service with TLR1-SR1 820 and TLR1-SR2 830 at TLR1 810, and a third service with TLR2-SR1 850 and TLR2-SR2 860 at TLR2 812. The list of service(s) may be specified, for example, using a service ID in the payload information of control message 1320 sent using BFD or other reliable transport mechanisms between Edge-A 210A and Edge-B 210B.

For simplicity, control message 1320 includes non-preemptive code=NP(TLR1) associated with TLR1 810. Referring to state information 1330 in FIG. 13, the purpose is to implement the non-preemptive mode at TLR1 810 (see 1334), but not at PLR 110 and TLR2 812 (see 1332 and 1336). In this case, based on the non-preemptive code, TLR1-SR1 820 will operate in state=STANDBY after the failure recovery of Edge-A 210A. At Edge-B 210B, TLR1-SR2 830 will operate in state=ACTIVE to handle all network traffic for TLR1 810 (see 1340, 1342 and 1344 in FIG. 13).

In contrast, the non-preemptive code is not configured for PLR 110 and TLR2 812. As such, PLR-SR1 120A and TLR2-SR1 850 at Edge-A 210A will operate in state=ACTIVE to handle all network traffic of tier-0 PLR 110 and tier-1 TLR2 812 respectively (see 1350, 1352, 1354 in FIG. 13). At Edge-B 210B, PLR-SR2 120B and TLR2-SR2 860 at Edge-B 210B will operate in state=STANDBY.

As mentioned above, a list of multiple services may be specified in practice. For example, non-preemptive code=NP(S1=TLR1, S2=PLR) may also be used to configure the non-preemptive mode for TLR1 810 and PLR 110. This provides more control and flexibility for selecting particular services to implement the non-preemptive mode.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical network interface controller(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 13. For example, the computer system may implement processes performed by an edge device (e.g., Edge-A 210A, Edge-B 210B), routing component (e.g., PLR-SR1 120A, PLR-SR2 120B, TLR1-SR1 820, TLR1-SR2 830, TLR2-SR1 850, TLR2-SR2 860), host, etc.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method to handle failure at a logical router according to a non-preemptive mode, wherein the logical router includes a first routing component and a second routing component that connect a first network with a second network, and the method comprises:
    in response to detecting, by the first routing component operating in a standby state, a failure associated with the second routing component operating in an active state,
        generating, by the first routing component, a control message that includes a non-preemptive code to instruct the second routing component not to operate in the active state after a recovery from the failure, wherein the non-preemptive mode is implemented at a particular tier or particular tiers from multiple tiers of the logical router based on the non-preemptive code;
        sending, by the first routing component, the control message to the second routing component; and
        performing, by the first routing component, a state transition from the standby state to the active state; and
    in response to detecting, by the first routing component operating in the active state, network traffic during the failure or after the recovery of the second routing component,
        forwarding the network traffic, by the first routing component, from the first network to the second network, or from the second network to the first network according to the non-preemptive mode at the particular tier or the particular tiers.

2. The method of claim 1, wherein generating the control message comprises:
    configuring the non-preemptive code to implement the non-preemptive mode at the particular tier from multiple tiers of the logical router, wherein the first routing component and second routing component reside on the particular tier.

3. The method of claim 1, wherein generating the control message comprises:
    configuring the non-preemptive code to implement the non-preemptive mode at the multiple tiers of the logical router, wherein the first routing component and second routing component reside on one of the multiple tiers.

4. The method of claim 1, wherein generating the control message comprises:
    configuring the non-preemptive code to implement the non-preemptive mode for a particular service associated with the first routing component and second routing component.

5. The method of claim 1, wherein the method further comprises:
    prior to detecting the failure, performing, by the first routing component operating in an initialization state, a state transition to the standby state in response to determination that the second routing component is operating in the active state.

6. The method of claim 5, wherein the method further comprises:
    performing the state transition from the initialization state to the standby state by configuring an inferior routing metric associated with the first routing component; and
    performing the state transition from the standby state to the active state by removing the inferior routing metric to attract the network traffic from the second network.

7. The method of claim 5, wherein the method further comprises:
    performing the state transition from the initialization state to the standby state by configuring a datapath transit link connecting the first routing component and a third routing component of the logical router to be down; and
    performing the state transition from the standby state to the active state by configuring the datapath transit link to be up to forward the network traffic to and from the third routing component.

8. The method of claim 1, wherein detecting the failure comprises at least one of the following:
    detecting the failure associated with a fault detection session between a first edge node supporting the first routing component and a second edge node supporting the second routing component; and
    receiving a control message from the second routing component reporting that the failure has occurred at the second routing component.

9. A non-transitory computer-readable storage medium that includes a set of instructions which, in response to execution by a processor of an edge device supporting a first routing component, cause the processor to implement a method of failure handling at a logical router according to a non-preemptive mode, wherein the logical router includes the first routing component and a second routing component that connect a first network with a second network, and the method comprises:
    in response to detecting, by the first routing component operating in a standby state, a failure associated with the second routing component operating in an active state,
        generating, by the first routing component, a control message that includes a non-preemptive code to instruct the second routing component not to operate in the active state after a recovery from the failure, wherein the non-preemptive mode is implemented at a particular tier or particular tiers from multiple tiers of the logical router based on the non-preemptive code;
        sending, by the first routing component, the control message to the second routing component; and performing, by the first routing component, a state transition from the standby state to the active state; and in response to detecting, by the first routing component operating in the active state, network traffic during the failure or after the recovery of the second routing component,
forwarding the network traffic, by the first routing component, from the first network to the second network, or from the second network to the first network according to the non-preemptive mode at the particular tier or the particular tiers.

10. The non-transitory computer-readable storage medium of claim 9, wherein generating the control message comprises:
configuring the non-preemptive code to implement the non-preemptive mode at the particular tier from multiple tiers of the logical router, wherein the first routing component and second routing component reside on the particular tier.

11. The non-transitory computer-readable storage medium of claim 9, wherein generating the control message comprises:
configuring the non-preemptive code to implement the non-preemptive mode at the multiple tiers of the logical router, wherein the first routing component and second routing component reside on one of the multiple tiers.

12. The non-transitory computer-readable storage medium of claim 9, wherein generating the control message comprises:
configuring the non-preemptive code to implement the non-preemptive mode for a particular service associated with the first routing component and second routing component.

13. The non-transitory computer-readable storage medium of claim 9, wherein the method further comprises:
prior to detecting the failure, performing, by the first routing component operating in an initialization state, a state transition to the standby state in response to determination that the second routing component is operating in the active state.

14. The non-transitory computer-readable storage medium of claim 13, wherein the method further comprises:
performing the state transition from the initialization state to the standby state by configuring an inferior routing metric associated with the first routing component; and
performing the state transition from the standby state to the active state by removing the inferior routing metric to attract the network traffic from the second network.

15. The non-transitory computer-readable storage medium of claim 13, wherein the method further comprises:
performing the state transition from the initialization state to the standby state by configuring a datapath transit link connecting the first routing component and a third routing component of the logical router to be down; and
performing the state transition from the standby state to the active state by configuring the datapath transit link to be up to forward the network traffic to and from the third routing component.

16. The non-transitory computer-readable storage medium of claim 9, wherein detecting the failure comprises at least one of the following:
detecting the failure associated with a fault detection session between a first edge node supporting the first routing component and a second edge node supporting the second routing component; and receiving a control message from the second routing component reporting that the failure has occurred at the second routing component.

17. An edge device configured to implement a first routing component to handle failure at a logical router according to a non-preemptive mode, wherein the logical router includes the first routing component and a second routing component that connect a first network with a second network, and the edge device comprises:
a processor; and
a non-transitory computer-readable medium having stored thereon instructions that, when executed by the processor, cause the processor to:
in response to detecting, by the first routing component operating in a standby state, a failure associated with the second routing component operating in an active state,
generate, by the first routing component, a control message that includes a non-preemptive code to instruct the second routing component not to operate in the active state after a recovery from the failure, wherein the non-preemptive mode is implemented at a particular tier or particular tiers from multiple tiers of the logical router based on the non-preemptive code;
send, by the first routing component, the control message to the second routing component; and
perform, by the first routing component, a state transition from the standby state to the active state; and
in response to detecting, by the first routing component operating in the active state, network traffic during the failure or after the recovery of the second routing component,
forward the network traffic, by the first routing component, from the first network to the second network, or from the second network to the first network according to the non-preemptive mode at the particular tier or the particular tiers.

18. The edge device of claim 17, wherein the instructions for generating the control message cause the processor to:
configure the non-preemptive code to implement the non-preemptive mode at the particular tier from multiple tiers of the logical router, wherein the first routing component and second routing component reside on the particular tier.

19. The edge device of claim 17, wherein the instructions for generating the control message cause the processor to:
configure the non-preemptive code to implement the non-preemptive mode at the multiple tiers of the logical router, wherein the first routing component and second routing component reside on one of the multiple tiers.

20. The edge device of claim 17, wherein the instructions for generating the control message cause the processor to:
configure the non-preemptive code to implement the non-preemptive mode for a particular service associated with the first routing component and second routing component.

21. The edge device of claim 17, wherein the instructions further cause the processor to:
prior to detecting the failure, perform, by the first routing component operating in an initialization state, a state transition to the standby state in response to determination that the second routing component is operating in the active state.

22. The edge device of claim 21, wherein the instructions further cause the processor to:

perform the state transition from the initialization state to the standby state by configuring an inferior routing metric associated with the first routing component; and perform the state transition from the standby state to the active state cause the processor to remove the inferior routing metric to attract the network traffic from the second network.

23. The edge device of claim 21, wherein the instructions further cause the processor to:

perform the state transition from the initialization state to the standby state by configuring a datapath transit link between the first routing component and a third routing component of the logical router to be down; and perform the state transition from the standby state to the active state by configuring the datapath transit link to be up to receive or send the network traffic via the third routing component.

24. The edge device of claim 17, wherein the instructions for detecting the failure cause the processor to perform at least one of the following:

detect the failure associated with a fault detection session between the edge device supporting the first routing component and a second edge device supporting the second routing component; and receive a control message from the second routing component reporting that the failure has occurred at the second routing component.

* * * * *